3,125,495
MICROBIAL PREPARATION OF 7- AND 15-HYDROXY STEROIDS
Allen I. Laskin, Somerset, and Josef Fried, Princeton, N.J., assignors to Olin Mathieson Chemical Corporation, New York, N.Y., a corporation of Virginia
No Drawing. Filed Apr. 19, 1962, Ser. No. 188,899
4 Claims. (Cl. 195—51)

This invention relates to and has for its objects the provision of an improved process for the hydroxylation of steroids containing an aromatic A-ring and of certain new steroids produced thereby.

It is well known that steroidal ketones possessing either a saturated or partially unsaturated A-ring are readily attacked by a large variety of microorganisms with the formation of a wide variety of chemical entities. In contrast, reports concerning the microbiological transformation of steroids possessing an aromatic A-ring, such as estrone and estradiol, have been scant. It has now been found that if a microorganism of the species *Aspergillus carneus* is employed, steroids possessing an aromatic A-ring are hydroxylated, thereby yielding a mixture of the corresponding 7α-hydroxyl and 15α-hydroxyl derivatives. In addition, there are also obtained the corresponding 17α-hydroxy derivatives if a 17-ketone is employed and the corresponding 17-ketones if a 17β-hydroxy steroid is employed as the steroid substrate.

In its broadest aspects, therefore, the process of this invention entails subjecting a steroid containing an aromatic A-ring to the action of enzymes of the microorganism *Aspergillus carneus* and recovering the products formed. More narrowly, the process of this invention is directed to the subjecting of estrone or estradiol to the action of the enzymes of the microorganism *Aspergillus carneus* under oxidizing conditions and recovering the steroids formed. The oxidation is preferably effected by either including the streoid in an aerobic culture of the microorganism, or by bringing together in an aqueous medium the steroid, air and enzymes of non-proliferating cells of the microorganism.

In general, the conditions for culturing *Aspergillus carneus* for the purposes of this invention are (except for the inclusion of the steroid to be converted) the same as those for culturing various microorganisms for the production of antibiotics and/or vitamin $B_{12}$, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers' solubles) or synthetic (i.e., composed of simple, synthesizable organic or inorganic compounds).

An adequate, sterile air supply should be maintained during the fermentation, for example, by the conventional methods of exposing a large surface of the medium to air, or by utilizing submerged aerated cultures. The steroid may be added to the culture during the incubation period, or included in the medium prior to sterilization or inoculation. The culture period may vary considerably, the range of about 6 to 96 hours being feasible, but not limiting.

Among the steroids which may be hydroxylated in accordance with the process of this invention are those steroids containing an aromatic A-ring. Particularly preferred are the steroids of the estrane series, as exemplified by estrone, estradiol, equilin, 9(11)-dehydroestrone and 8-dehydroestrone. In addition to these steroids, steroids possessing in addition an aromatic B-ring, such as equilenin, and steroids already having additional hydroxyl groups, such as 16α- and 16β-hydroxyestrone and 6α- and 6β-hydroxyestradiol, may also be used.

The process yields a mixture of 7α-hydroxy and 15α-hydroxy steroids. The mixture may be separated into its component parts in the usual manner, as by solvent extraction, fractional crystallization and chromatography. If estradiol is employed as the starting steroid, a mixture of 7α-hydroxyestrone, 7α-hydroxyestradiol and 15α-hydroxyestradiol is obtained. If estrone is employed as the starting steroid a mixture of 7α-hydroxyestrone, 15α-hydroxyestrone, 7α-hydroxyestradiol and 15α-hydroxyestradiol is obtained.

All of the compounds obtained by the process of this invention are physiologically active substances possessing estrogenic activity and hence can be used in lieu of known estrogenic agents, such as estradiol valerate, in the treatment of symptoms of menopause, etc.

The following examples are illustrative of the invention (all temperatures being in centigrade):

EXAMPLE 1

*7α-Hydroxyestradiol, 7α-Hydroxyestrone and 15α-Hydroxyestradiol*

Surface growth from a three-week old agar slant culture of *Aspergillus carneus* (Centraalbureau voor Schimmel cultures, Baarn, Holland), the slant containing as a nutrient medium (A): glucose, 10 g.; Difco yeast extract, 2.5; $K_2HPO_4$, 1 g.; agar, 20 g.; and distilled water to 1 l., is suspended in 2.5 ml. of an 0.01% sodium lauryl sulfate aqueous solution. One milliliter portions of the suspension are used to inoculate two 250 ml. conical flasks, each containing 50 ml. of the following sterilized nutrient medium (B): dextrose, 10 g.; cornsteep liquor, 6 g.; $NH_4H_2PO_4$, 3 g.; Difco yeast extract, 2.5 g.; $CaCl_3$, 2.5 g.; and distilled water to 1 l. After 72 hours of incubation at 25° with continuous rotary agitation (280 cycles per minute, 2 inch radius), 10% (vol./vol.) transfers are made to twelve 250 ml. conical flasks each containing 50 ml. of fresh sterilized medium B. These are concentrated under the same conditions for four days after which another 10% (vol./vol.) transfer is made to one hundred additional 250 ml. flasks containing 50 ml. of fresh sterilized medium B. Estradiol is added by adding to each flask 0.25 ml. of a sterile solution of the steroid in N,N-dimethylformamide (100 mg./ml.) so that the medium is supplemented with 500 μg./ml. of steroid. After five days of further incubation, the contents of the flasks are pooled and filtered through a Seitz clarifying pad. The flasks, mycelium and pad are washed with successive 50 ml. portions of warm water. The combined filtrate and washings has a volume to 4,250 ml.

The combined filtrate and washings are extracted with three 1 l. portions of methyl isobutyl ketone. The combined extracts are evaporated to dryness leaving 1.57 g. of semicrystalline residue. This material is triturated with chloroform and the crystalline residue, 1.25 g., triturated with acetone. The resulting residue on recrystallization from acetone and finally from 95% ethanol produces pure 15α-hydroxyestradiol, M.P. 246–248°; infrared identical with that of an authentic sample. The combined mother liquors obtained in the above triturations with chloroform and acetone are evaporated to dryness in vacuo and the resulting residue (1.4 g.) treated with ethyl acetate. This produces about 425 mg. of crystals consisting mainly of 7α-hydroxyestradiol contaminated by a small amount of 7α-hydroxyestrone as well as a mother liquor, which is concentrated to a volume of 10 ml. for chromatography as described below. To separate the two compounds the material is recrystallized from 95% alcohol which furnishes about 44 mg. of 7α-hydroxyestrone identified by its infrared spectrum. The mother liquors are evaporated to dryness and recrystallized from ethyl acetate furnishing about 75 mg. of pure 7α-hydroxyestradiol, M.P. 255–257°.

*Analysis.*—Calcd. for $C_{18}H_{24}O_3$ (288.37): C, 74.97; H, 8.39. Found: C, 75.18; H, 8.39.

The infrared spectrum of this sample is identical with that of an authentic specimen.

The above-described ethyl acetate mother liquor (10 ml.) is chromatographed on 32 g. of acid-washed alumina. Elution of the column with ethyl acetate (350 ml.) furnishes about 210 mg. of crystalline material which after recrystallization from acetone-ether yields about 50 mg. of 7α-hydroxyestrone. Continued elution with ethyl acetate-acetone 1:1 (250 ml.) gives an additional 25 mg. of 7α-hydroxyestrone. Subsequent elution with 350 ml. of ethyl acetate-acetone 1:1 and with acetone (300 ml.) furnishes about 210 mg. of crude crystals which on recrystallization from acetone yields about 28 mg. of pure 15α-hydroxyestradiol, M.P. 248–250°.

EXAMPLE 2

*7α-Hydroxyestrone, 15α-Hhydroxestrone, 7α-Hydroxyestradiol and 15α-Hydroxyestradiol*

Following the procedure of Example 1, but substituting an equivalent amount of estrone for the estradiol, 7α-hydroxyestrone, 15α-hydroxyestrone, 7α-hydroxyestradiol and 15α-hydroxyestradiol are obtained.

This invention may be variously otherwise embodied within the scope of the appended claims.

What is claimed is:

1. A process for converting a steroid of the estrane series containing an aromatic A-ring and unsubstituted in the 7 and 15 positions to its 7 and 15 hydroxy derivatives, which comprises subjecting such streoid to the action of enzymes of a microorganism of the species *Aspergillus carneus*.

2. A process for converting a steroid to its 7 and 15 hydroxy derivatives, which comprises subjecting a steroid selected from the group consisting of estrone and estradiol to the action of enzymes of a microorganism of the species *Aspergillus carneus* under oxidizing conditions.

3. A process for converting estradiol to 7α-hydroxyestradiol, 7α-hydroxyestrone and 15α-hydroxyestradiol, which comprises subjecting estradiol to the action of enzymes of a microorganism of the species *Aspergillus carneus* under oxidizing conditions.

4. A process for converting estrone to 7α-hydroxyestrone, 15α-hydroxyestrone, 7α-hydroxyestradiol and 15α-hydroxyestradiol, which comprises subjecting estrone to the action of enzymes of a microorganism of the species *Aspergillus carneus* under oxidizing conditions.

References Cited in the file of this patent

UNITED STATES PATENTS

| | | |
|---|---|---|
| 2,649,402 | Murray et al. | Aug. 18, 1953 |
| 2,905,593 | Dulaney | Sept. 22, 1959 |